US008850838B2

(12) United States Patent
Street et al.

(10) Patent No.: US 8,850,838 B2
(45) Date of Patent: Oct. 7, 2014

(54) DISTRIBUTED INTELLIGENCE CONTROL FOR COMMERCIAL REFRIGERATION

(75) Inventors: Norman E. Street, O'Fallon, MO (US); Ted W. Sunderland, O'Fallon, MO (US); Charles D. Thomas, St. Louis, MO (US); Doron Shapiro, St. Louis, MO (US); Michael J. D'Anna, Eureka, MO (US)

(73) Assignee: Hussmann Corporation, Bridgeton, MO (US)

( * ) Notice: Subject to any disclaimer, the term of this patent is extended or adjusted under 35 U.S.C. 154(b) by 2946 days.

(21) Appl. No.: 10/220,678

(22) PCT Filed: Mar. 14, 2001

(86) PCT No.: PCT/US01/08072
§ 371 (c)(1),
(2), (4) Date: Sep. 4, 2002

(87) PCT Pub. No.: WO01/69147
PCT Pub. Date: Sep. 20, 2001

(65) Prior Publication Data
US 2003/0037555 A1    Feb. 27, 2003

Related U.S. Application Data

(63) Continuation of application No. 09/524,939, filed on Mar. 14, 2001, now Pat. No. 6,332,327.

(51) Int. Cl.
F25B 7/00        (2006.01)
F25B 49/00     (2006.01)
B60H 1/00      (2006.01)

(52) U.S. Cl.
USPC ............................... 62/175; 62/127; 165/11.1

(58) Field of Classification Search
USPC ........... 62/125, 127, 129, 130, 175, 510, 126; 236/51, 94; 165/11.1
See application file for complete search history.

(56) References Cited

U.S. PATENT DOCUMENTS 3,312,081 A    4/1967 Berger et al.
3,527,059 A    9/1970 Rust et al.
(Continued)

FOREIGN PATENT DOCUMENTS

WO    WO 98/40800    9/1998
WO    WO 99/17066    4/1999
(Continued)

OTHER PUBLICATIONS

As Interface (ASI) News—"AS-Interface accepted as European Standard", 1 page, available at http://www.as-interface.com/news/en50295.html on Sep. 23, 1999.

(Continued)

*Primary Examiner* — Chen Wen Jiang
(74) *Attorney, Agent, or Firm* — Michael Best & Friedrich LLP

(57) ABSTRACT

A commercial refrigeration system has a control system which distributes intelligence to increase granularity of the control and simplify wiring, assembly and installation. Compressors of the refrigeration system each have a bus compatible compressor safety and control module including a processor and sensors. All control and safety modules communicate over a single power and communications line with the controller, providing digital transmissions to the controller of measurements taken by the sensors. The information provided may include that the compressor is outside of a specific safety parameter, so that the controller knows not only that a safety parameter has been traversed, but exactly which one. The control and safety modules are capable of executing commands from the controller to cycle the compressors. The control and safety modules preferably contain sufficient intelligence to continue system operation upon failure of the controller. A compressor is also disclosed which has an intelligent control and safety module. The compressor also houses control and safety devices within a hermetically or semi-hermetically sealed shell. A condenser controller is also disclosed that is capable of communicating with the controller to affect intelligent control of one or more compressor fans.

94 Claims, 6 Drawing Sheets

(56) References Cited

U.S. PATENT DOCUMENTS

| | | | |
|---|---|---|---|
| 3,735,377 A | 5/1973 | Kaufman | |
| 3,783,681 A | 1/1974 | Hirt et al. | |
| 3,874,187 A * | 4/1975 | Anderson | 62/230 |
| 4,060,716 A | 11/1977 | Pekrul et al. | |
| 4,071,078 A | 1/1978 | Padden | |
| 4,084,388 A | 4/1978 | Nelson | |
| 4,102,394 A | 7/1978 | Botts | |
| 4,152,902 A | 5/1979 | Lush | |
| 4,184,341 A | 1/1980 | Friedman | |
| 4,246,763 A | 1/1981 | Mueller et al. | |
| 4,325,223 A | 4/1982 | Cantley | |
| 4,333,316 A | 6/1982 | Stamp, Jr. et al. | |
| 4,372,119 A | 2/1983 | Gillbrand et al. | |
| 4,384,462 A | 5/1983 | Overman et al. | |
| 4,390,321 A | 6/1983 | Langlois et al. | |
| 4,390,922 A | 6/1983 | Pelliccia | |
| 4,399,548 A | 8/1983 | Castleberry | |
| 4,425,010 A | 1/1984 | Bryant et al. | |
| 4,429,578 A | 2/1984 | Darrel et al. | |
| 4,478,051 A | 10/1984 | Ibrahim | |
| 4,479,389 A | 10/1984 | Anderson, III et al. | |
| 4,545,210 A | 10/1985 | Lord | |
| 4,603,348 A | 7/1986 | Yamada et al. | |
| 4,614,089 A | 9/1986 | Dorsey | |
| 4,648,814 A | 3/1987 | Shiibayashi | |
| 4,653,280 A | 3/1987 | Hansen et al. | |
| 4,663,725 A | 5/1987 | Truckenbrod et al. | |
| 4,748,820 A | 6/1988 | Shaw | |
| 4,811,897 A * | 3/1989 | Kobayashi et al. | 236/49.3 |
| 4,812,997 A | 3/1989 | Okochi et al. | |
| 4,829,779 A | 5/1989 | Munson et al. | |
| 4,842,044 A | 6/1989 | Flanders et al. | |
| 4,884,412 A | 12/1989 | Sellers et al. | |
| 4,885,564 A | 12/1989 | Vercellotti et al. | |
| 4,909,076 A | 3/1990 | Busch et al. | |
| 4,913,625 A | 4/1990 | Gerlowski | |
| 4,951,029 A | 8/1990 | Severson | |
| 4,958,502 A | 9/1990 | Satoh et al. | |
| 4,967,567 A | 11/1990 | Proctor et al. | |
| 5,012,652 A | 5/1991 | Dudley | |
| 5,035,119 A | 7/1991 | Alsenz | |
| 5,050,397 A | 9/1991 | Sugiyama et al. | |
| 5,056,036 A | 10/1991 | Van Bork | |
| 5,062,278 A | 11/1991 | Sugiyama | |
| 5,065,591 A | 11/1991 | Shaw | |
| 5,109,700 A | 5/1992 | Hicho | |
| 5,123,256 A | 6/1992 | Oltman | |
| 5,128,855 A | 7/1992 | Hilber et al. | |
| 5,131,237 A | 7/1992 | Valbjern | |
| 5,142,877 A | 9/1992 | Shimizu | |
| 5,181,389 A | 1/1993 | Hanson et al. | |
| 5,203,178 A | 4/1993 | Shyu | |
| 5,209,076 A * | 5/1993 | Kauffman et al. | 62/126 |
| 5,224,835 A | 7/1993 | Oltman | |
| 5,231,846 A | 8/1993 | Goshaw et al. | |
| 5,249,429 A | 10/1993 | Hanson | |
| 5,279,458 A * | 1/1994 | DeWolf et al. | 236/47 |
| 5,323,385 A | 6/1994 | Jurewicz et al. | |
| 5,327,742 A | 7/1994 | Duff et al. | |
| 5,362,206 A | 11/1994 | Westerman et al. | |
| 5,381,692 A | 1/1995 | Winslow et al. | |
| 5,390,206 A | 2/1995 | Rein et al. | |
| 5,437,163 A | 8/1995 | Jurewicz et al. | |
| 5,448,230 A | 9/1995 | Schanker et al. | |
| 5,460,006 A | 10/1995 | Torimitsu | |
| 5,465,081 A | 11/1995 | Todd | |
| 5,499,512 A | 3/1996 | Jurewicz et al. | |
| 5,509,786 A | 4/1996 | Mizutani et al. | |
| 5,515,693 A | 5/1996 | Cahill O'Brien et al. | |
| 5,533,347 A | 7/1996 | Ott et al. | |
| 5,561,817 A | 10/1996 | McCormack et al. | |
| 5,566,879 A | 10/1996 | Longtin | |
| 5,577,390 A | 11/1996 | Kaido et al. | |
| 5,586,444 A | 12/1996 | Fung | |
| 5,586,446 A * | 12/1996 | Torimitsu | 62/126 |
| 5,592,824 A | 1/1997 | Sogabe et al. | |
| 5,596,878 A | 1/1997 | Hanson et al. | |
| 5,598,566 A | 1/1997 | Pascucci et al. | |
| 5,602,757 A | 2/1997 | Haseley et al. | |
| 5,610,339 A | 3/1997 | Haseley et al. | |
| 5,626,027 A | 5/1997 | Dormer et al. | |
| 5,630,324 A | 5/1997 | Yoshida et al. | |
| 5,634,345 A | 6/1997 | Alsenz | |
| 5,647,223 A | 7/1997 | Wada et al. | |
| 5,690,963 A | 11/1997 | Spargo et al. | |
| 5,701,482 A | 12/1997 | Harrison et al. | |
| 5,707,210 A | 1/1998 | Ramsey et al. | |
| 5,713,724 A | 2/1998 | Centers et al. | |
| 5,743,098 A | 4/1998 | Behr | |
| 5,763,959 A | 6/1998 | Chambers | |
| 5,797,729 A | 8/1998 | Rafuse et al. | |
| 5,822,739 A | 10/1998 | Kara | |
| 5,825,664 A | 10/1998 | Warrior et al. | |
| 5,853,123 A * | 12/1998 | Okano et al. | 236/51 |
| 5,884,072 A | 3/1999 | Rasmussen | |
| 5,918,474 A * | 7/1999 | Khanpara et al. | 62/179 |
| 5,940,337 A | 8/1999 | Jiang | |
| 5,950,709 A | 9/1999 | Krueger et al. | |
| 5,975,854 A * | 11/1999 | Culp, III et al. | 417/18 |
| 5,984,645 A | 11/1999 | Cummings | |
| 6,005,424 A | 12/1999 | Douglass | |
| 6,017,192 A * | 1/2000 | Clack et al. | 417/18 |
| 6,041,605 A | 3/2000 | Heinrichs | |
| 6,098,413 A * | 8/2000 | Wada | 62/127 |
| 6,125,642 A | 10/2000 | Seener et al. | |
| 6,178,362 B1 | 1/2001 | Woolard et al. | |
| 6,185,946 B1 | 2/2001 | Hartman | |
| 6,276,901 B1 | 8/2001 | Farr et al. | |
| 6,294,889 B1 | 9/2001 | Briant et al. | |
| 6,302,654 B1 | 10/2001 | Millet et al. | |
| 6,332,327 B1 | 12/2001 | Street et al. | |
| 6,427,461 B1 | 8/2002 | Whinery et al. | |
| 6,449,715 B1 | 9/2002 | Krivoshein | |
| 6,533,552 B2 | 3/2003 | Centers et al. | |
| 6,579,078 B2 | 6/2003 | Hill et al. | |
| 6,647,476 B2 | 11/2003 | Nagasawa et al. | |
| 6,647,735 B2 | 11/2003 | Street et al. | |
| 6,820,157 B1 | 11/2004 | Eide et al. | |
| 2003/0037555 A1 | 2/2003 | Street et al. | |
| 2004/0016241 A1 | 1/2004 | Street | |
| 2004/0016244 A1 | 1/2004 | Street | |
| 2004/0016251 A1 | 1/2004 | Street | |
| 2004/0016253 A1 | 1/2004 | Street | |
| 2004/0024495 A1 | 2/2004 | Sunderland | |
| 2004/0093879 A1 | 5/2004 | Street | |
| 2004/0144849 A1 | 7/2004 | Ahmed | |
| 2004/0193330 A1 | 9/2004 | Mehaffey et al. | |

FOREIGN PATENT DOCUMENTS

| | | |
|---|---|---|
| WO | WO 99/24771 | 5/1999 |
| WO | 01/069147 | 9/2001 |
| WO | 02075227 | 9/2002 |

OTHER PUBLICATIONS

As Interface (ASI) News—"Technical Enhancements Extend As Interface Capabilities", 2 pages, dated Oct. 28, 1998, available at http://www.as-interface.com/news/en50295.html on Sep. 23, 1999.

Siemens Manual, "Actuator Sensor Interface-System Discription", May 1996, Siemens Aktiengesellschaft, German, 63 pages. Siemens Manual, "Actuator Sensor Interface", 1999, Siemens Energy & Automation, Inc., Batavia, Illinois, 128 pages.

Echelon Corporation—"Introduction to the LonWorks® System" (Version 1.0), Published by Echelon Corporation, Palo Alto, California, 1999, 74 pages.

(56) References Cited

OTHER PUBLICATIONS

Michael R. Tennefoss, "Echelon White Paper: Implementing Open, Interoperable Building Control systems", Published by Echelon Torimitsu Corporation, Palo Alto, California, 2000, 14 pages.

American Microsystems, Inc., "A2SITM Advanced AS-interface IC", Published by American Microsystems, Inc., Pocatello, Idaho, Mar. 2000, 27 pages.

European Patent Office Examination Report for Application No. 01918635.2 dated Feb. 21, 2007 (5 pages).

European Patent Office Decision to Grant for Application No. 01918635.2 dated Nov. 5, 2009 (2 pages).

European Patent Office Communication for Application No. 01918635.2 dated Jun. 9, 2009 (6 pages).

\* cited by examiner

DISTRIBUTED INTELLIGENCE CONTROL FOR COMMERCIAL REFRIGERATION

CROSS-REFERENCE TO RELATED APPLICATIONS

This application is a national stage filing under 35 USC 371 of International Application No. PCT/US01/08072, filed Mar. 14, 2001, which is a continuation of U.S. patent application Ser. No. 09/524,939, filed Mar. 14, 2000, now U.S. Pat. No. 6,332,327. These applications are incorporated herein by reference in their entirety.

BACKGROUND OF THE INVENTION

This invention relates generally to commercial refrigeration and more particularly to a commercial refrigeration system having unique power wiring and distribution of control intelligence features.

Great advances have been made over the last 50 years in all aspects of refrigerated food store merchandisers and coolers and the various commercial systems therefor. Retail food merchandising is conducted to a great degree in large supermarkets, each requiring substantial refrigeration capacity. For example, a 50,000 square foot (4,650 square meter) supermarket may have refrigerated display fixtures and other coolers and preparation rooms requiring an aggregate refrigeration capacity in excess of 80 tons (1,000,000 BTU/hr. or 242,000 kcal/hr.) which may include over 20 tons (60,500 kcal/hr.) of low temperature refrigeration at evaporator temperatures in the range of −35° F. to −5° F. (−37° C. to −21° C.) and over 60 tons (181,500 kcal/hr.) of normal temperature refrigeration at evaporator temperatures in the range of 15° F. to 40° F. (−9° C. to 4° C.). Such present commercial refrigeration systems have a multitude of evaporator cooling coils for the various refrigerated product merchandisers located throughout the supermarket; and these evaporators are typically cooled by several multiplexed low temperature and medium temperature compressor systems. It is also known to use such systems in smaller environments such as convenience stores, or for the preservation of other perishables not related to the food store environment (e.g., blood, plasma, medical supplies).

Conventional practice is to put the refrigeration requirements of a supermarket into two or more multiplexed refrigeration systems; e.g., one for the low temperature refrigeration of frozen foods and ice cream at product temperatures in the range of −20° F. to 0° F. (−29° C. to −18° C.); and another for the normal temperature refrigeration of fresh foods including meat, dairy and produce at product temperatures in the range of 28° F. to 50° F. (−2° C. to 10° C.). Each such system is a closed system having a single condenser/receiver and common discharge suction and liquid distribution headers with parallel circuits of the latter to the respective merchandiser or cooler evaporators and with the various complex valving requirements to balance suction pressures (EPR valves) and to accommodate selective evaporator isolation for gas or other types of defrosting. In any event, the multiplexed compressors of such systems are usually installed in back machine rooms and typically connect to roof top air-cooled condensers, which in turn connect back to the machine room to a receiver and thence to the liquid refrigerant distribution header and various high side valving and liquid line circuit outlets.

The multiplexed compressors in a refrigeration system are typically mounted together on a rack and piped in parallel, each having a low side connected to a suction header and a high side connected to the discharge header. The operation of the compressors is cycled, based on a measured system parameter, to maintain a desired level of refrigeration. Usually, the measured parameter is suction pressure at the suction header. A transducer on the suction header provides a signal to a compressor controller indicating the suction pressure, and the controller compares the measured pressure with a setpoint pressure and turns the compressors off and on accordingly, taking into consideration other factors such as compressor run time. It is also known to adjust system capacity in other ways, such as by changing the speed of an individual compressor motor where the design of the compressor permits. Refrigeration level can also be affected by cycling condenser fans and in other ways not directly pertaining to the compressors.

In addition to the controller, each compressor has a high voltage protection circuit capable of shutting down the compressor when it operates outside any one of a number of predetermined safe operating limits. A high voltage line in a shielded conduit must be brought from the store utility power distribution center to the compressor where the protection circuit is located. The protection circuit normally energizes a compressor control coil to close a compressor contact in series with the compressor power line so that the compressor may run when activated by a relay operated by the controller. Operating limits are typically established for one or more of: motor winding temperature, oil level (or pressure), discharge pressure and phase loss/reversal. The protection circuit has a safety contact wired in series for each operating limit. When a particular operating limit as detected by a corresponding sensor is exceeded, the contact opens causing the control circuit to open, de-energizing the compressor contactor coil and disabling energization of the compressor by the controller.

Existing protection circuits are aware only that the operating limit has been traversed, and have no capability to provide information as to the actual value of the parameter. A separate alarm circuit from the controller to the control circuit is needed so that notification of the problem can be made. In order to know which operating limit was traversed, still more indicator circuits are required between each safety contact and the controller. Thus, a substantial amount of wiring is necessary to connect the compressor to the controller. Even if the protection circuit is so wired for providing maximum information, there are substantial gaps in information concerning the operation of the compressor because of the absence of the ability to give an absolute reading of the parameter measured.

A parallel switchback circuit may be wired in parallel to the controller so that electromechanical control of the compressor can be activated in the event of controller failure. The parallel switchback circuit allows a suction pressure control switch to activate the compressor in the absence of a functioning controller. The switchback circuit provides only crude system control subsequent to controller failure. In order to have such a circuit it will be necessary to install isolation relays to prevent the possibility of control interference from the switchback circuit when the controller is operating normally.

In addition to the control wiring described above, power wiring is also necessary. The compressor is powered by a high voltage, three phase 480V AC or 208V AC line (or various other three phase power sources) and the control circuit is powered by a single phase 120V AC or 208V AC high voltage line. Two high voltage lines must be wired for each compressor; one three phase for the compressor motor and one single phase line for the protection circuit. These lines are required to be shielded, such as by placement in a conduit. Thus, a number of shielded power lines are required for each compressor rack, making existing wiring complex and costly.

Most of the sensors now used for monitoring safety and control parameters for the compressors are located outside of the compressor. Suction pressure monitoring is typically from the suction header, substantially remote from the compressors. Sensors associated with the safety module are located on the compressor. Thus, all of these items are exposed to potential damage during shipping and installation.

SUMMARY OF THE INVENTION

Among the several objects and features of the present invention may be noted the provision of a commercial refrigeration system having distributed intelligence control functions; the provision of such a distributed intelligence control for a refrigeration system which can operate in case of main controller failure; the provision of such a refrigeration system control which is capable of continuously monitoring the status of operating parameters of multiplexed compressors; the provision of such a commercial refrigeration system control which provides substantial information about compressor operating characteristics; the provision of such a refrigeration system control which is easy to assemble and install; the provision of such a refrigeration system control which operates control functions at low voltage; and the provision of such a refrigeration system which has simplified wiring.

Further among the several objects and features of the present invention may be noted the provision of a compressor safety and control module for a commercial refrigeration system which is capable of communicating compressor status information; the provision of such a compressor safety and control module which is capable of monitoring its own compressor's operating parameters; the provision of such a compressor which shields sensors; the provision of such a compressor and compressor safety control module which provides highly accurate operating parameter data; the provision of such a compressor safety control module which can operate in cooperation with other compressor safety control modules if a master controller fails; the provision of such a compressor and compressor safety control module which is easy to wire into a refrigeration system.

Generally, a commercial refrigeration system for use in a food store of the present invention comprises at least one fixture incorporating an evaporator constructed and arranged for cooling food in the fixture. A compressor in fluid communication with the evaporator for drawing refrigerant away from the evaporator is in fluid communication with a condenser for receiving refrigerant from the compressor. The condenser is constructed and arranged for removing heat from the refrigerant. An expansion valve in fluid communication with the condenser for receiving refrigerant from the condenser is constructed and arranged for delivering refrigerant into the evaporator. A compressor operating unit associated with the compressor is constructed and arranged for monitoring at least one operating parameter of the compressor and determining whether the operating parameter is within specification. A power and communication line extends from a master controller to the compressor operating unit and provides electrical power for the operating unit. The controller and compressor operating unit are constructed and arranged for digital communication over the power and communication line such that no separate power line for the operating unit must be wired upon installation of the system.

In another aspect of the present invention, the combination of a food store refrigeration system and controller means for controlling operation of compressor means of the refrigeration system. The system further comprises at least one fixture having evaporator means for cooling the fixture. The compressor means has its suction side connected to draw refrigerant vapor from the evaporator means, and condenser means is connected to the compressor discharge side for receiving high pressure refrigerant from the compressor means. The condenser means is operative for liquefying the refrigerant. Other means constructed and arranged for delivering refrigerant into the evaporator means is also provided. The controller means comprises a compressor control and safety module operatively associated, in use, between the compressor means and the controller means. The compressor control and safety module is constructed and arranged for monitoring at least one operating condition of the compressor means and determining whether it is within a prescribed operating parameter. A power and communication line extending from the controller means to the compressor control and safety module and provides electrical power therefor. The controller means and compressor control and safety module are constructed and arranged for digital communication through said power and communication line whereby no separate power line for the compressor or compressor control and safety module must be used upon installation of the system.

In yet another aspect of the present invention a commercial refrigeration compressor for use in a vapor phase refrigeration system having evaporative cooling means for refrigerating perishable products comprises an outer casing, an electric motor, a pressurizing unit constructed and arranged within the casing to be driven, in use, by the motor for drawing vaporous refrigerant from the cooling means at low pressure and pressurizing the vaporous refrigerant to a higher pressure. An operating unit includes a processor, at least one sensor strategically placed within the casing for monitoring an operating parameter of the compressor. The sensor is in communication with the processor. Switching means is connected to the processor for controlling activation and deactivation of the motor. The processor is configured for transmitting data regarding the sensed operating parameter to a master controller remote from the compressor and for receiving compressor control commands from such master controller and for executing such commands.

A further aspect of the present invention involves a refrigeration compressor for use in a vapor phase refrigeration system having evaporative cooling means for refrigerating perishable products. The compressor comprises an outer casing, an electric motor, a pressurizing unit constructed and arranged within the casing to be driven, in use, by the motor for drawing vaporous refrigerant from the cooling means at low pressure and pressurizing the vaporous refrigerant to a higher pressure, and an operating unit. The operating unit includes a processor, at least one sensor strategically placed within the casing for monitoring an operating parameter of the compressor and in communication with the processor. Switch means connected to the processor controls activation and deactivation of the motor. The processor is constructed and arranged to command the switch means in response to a control evaluation of the sensed operating parameter.

In still another aspect of the present invention, a refrigeration system compressor having an operating unit and plural sensors in combination with a master controller electronically connected to the operating unit. The operating unit comprises means for establishing a sensed digital signal representing the value of a refrigerant operating parameter. Means for holding holds the operating unit in a standard operation mode awaiting command signals from the master controller during a preset time period. Means transmits the digital signal to the master controller upon request therefrom and executing any command signal, if received, to change the refrigerating capacity of the compressor as dictated by the command signal. Means is provided for switching the operating unit into a master controller failure mode if no command signal is received within the preset time period. Means evaluates the sensed signal within the operating unit while in the failure mode and the operating unit assumes independent control of the compressor to change the refrigeration capacity thereof. Sequential time periods for the master controller to resume control and set by means within the operating unit.

In still a further aspect of the present invention, a method of distributed intelligence control of a compressor in a refrigeration system is disclosed. The refrigeration system has a plurality of fixtures. The compressor has a dedicated operating unit constructed and arranged to monitor at least two sensed operating parameters and is electronically dependent upon a master controller in a standard operation mode. The method generally comprises the steps of receiving sensed signals indicative of refrigerant conditions associated with the compressor into the operating unit. At least one sensed signal is converted to a digital signal representing the value of the refrigeration condition, and held the operating unit in the standard operation mode for a preselected time period awaiting a command signal from the master controller. The digital signal in the operating unit is transmitted to the master controller in response to a command signal received therefrom within the preselected time period, and any command signal from the master controller is executed to change the compressor operation. An independent control mode is assumed by the operating unit when the master controller is in a failure mode and sends no command signal to the operating unit within the preselected time period. The operating unit determines: (a) the required compressor operation responsive to the sensed signal and controls the compressor operation accordingly; and then (b) the operating unit waits another set period of time for a command signal from the master controller. Steps (a) and (b) are repeated if no command signal is received within said other set period of time.

These and still other objects and features of the present invention will become more apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
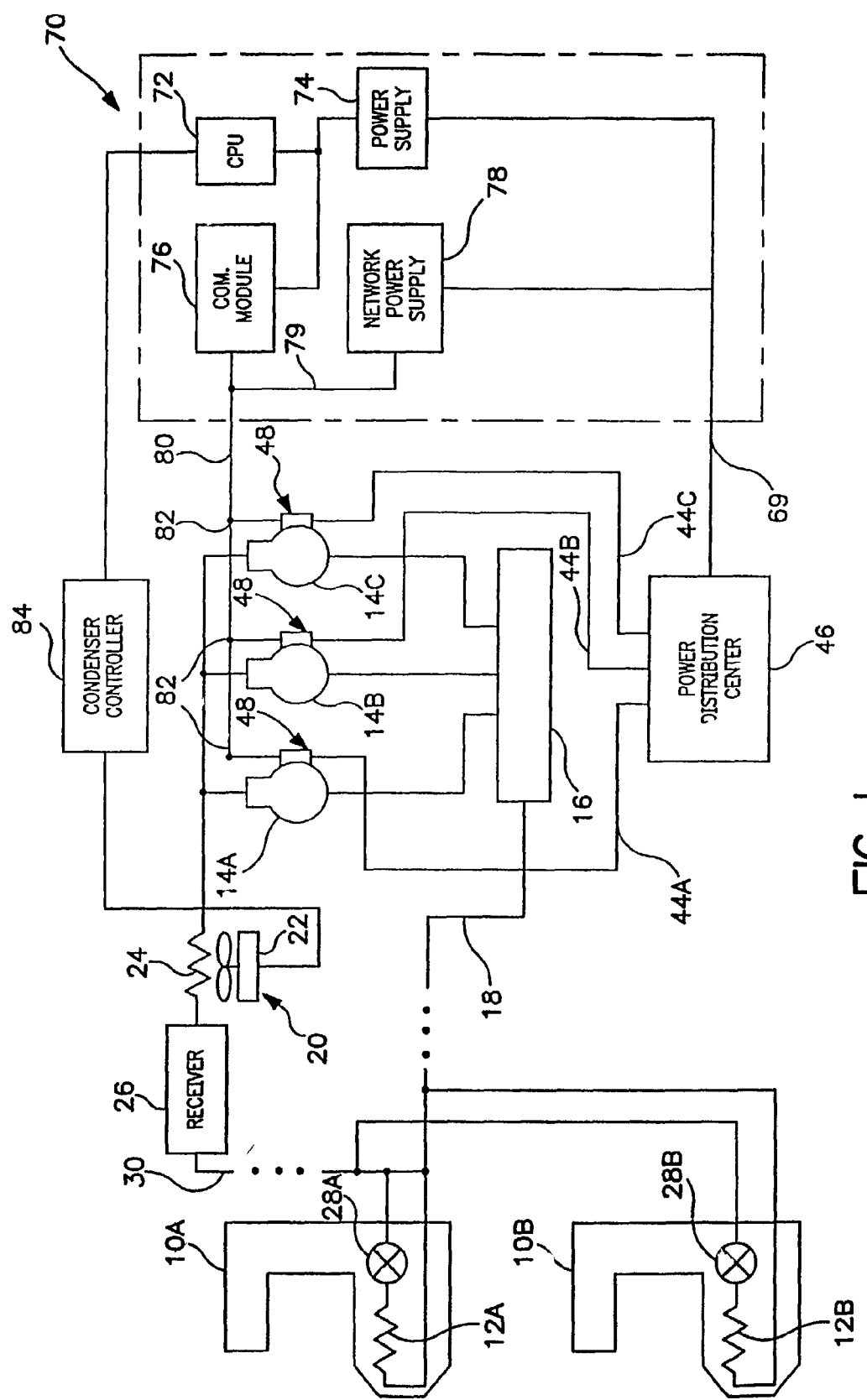
FIG. 1 is a schematic representation of a refrigeration system of the present invention in a food store.

Referring now to FIG. 1, a commercial refrigeration system for use in a food store is shown to comprise one or more fixtures which are illustrated as food display merchandisers 10A, 10B in the shopping arena of a food store. The merchandisers 10A, 10B each incorporate at least one evaporator coil 12A, 12B (or like heat exchanger unit) disposed for cooling the merchandiser. Three multiplexed compressors (designated 14A, 14B, 14C, respectively) are connected by way of a suction header 16 and a low side return pipe 18 in fluid communication with the low side of the evaporators 12A, 12B for drawing refrigerant away from the evaporators. A condenser (generally indicated at 20) including a fan 22 and heat exchanger 24 is in fluid communication on the high discharge side of the compressors 14A, 14B, 14C for removing heat and condensing refrigerant pressurized by the compressors. Although an air-cooled condenser 20 is shown, other types of condensers, such as those liquid cooled from a ground source water supply, may be used without departing from the scope of the present invention. Moreover, it is to be understood that the single illustrated fan 22 represents one or more fans typically used in a condenser for commercial refrigeration applications.

Refrigerant from the condenser 20 is conventionally stored in a receiver 26 in communication with expansion valves 28A, 28B by way of a high side liquid delivery line 30. The expansion valves 28A, 28B meter refrigerant into respective evaporators 12A, 12B and induce a pressure drop for absorbing heat, to complete the refrigeration circuit. The compressors 14A, 14B, 14C and usually also the suction header 16 and receiver 26 are mounted on a compressor (i.e., condensing unit) rack (not shown) prior to shipment to the store location where the refrigeration system is to be installed.

The food display merchandisers 10A, 10B illustrated with the evaporators 12A, 12B would be placed in the shopping arena of a food store. However, it is understood that other types of cooling fixtures could be placed in other parts of the store (e.g., a service area or back room cooler). The liquid line 30 and suction return line 18 have been broken to indicate connection to other evaporators (not shown) in the system. Evaporators may be connected to the same piping circuit between the receiver 26 and the suction header 16, or in a different circuit or "branch" (not shown) connected to the receiver. Further, the number of compressors 14 in the refrigeration system may be more or less than three (including only a single compressor) without departing from the scope of the present invention. The refrigeration system must include a compressor, a condenser, an expansion valve and an evaporator. Other components are preferably included but are not essential, and the precise mounting or location of the system components may be other than described without departing from the scope of the present invention. Moreover, the present invention has application outside the food store environment for cooling other perishable, non-food products such as blood, plasma and medical supplies.

Figure 3:
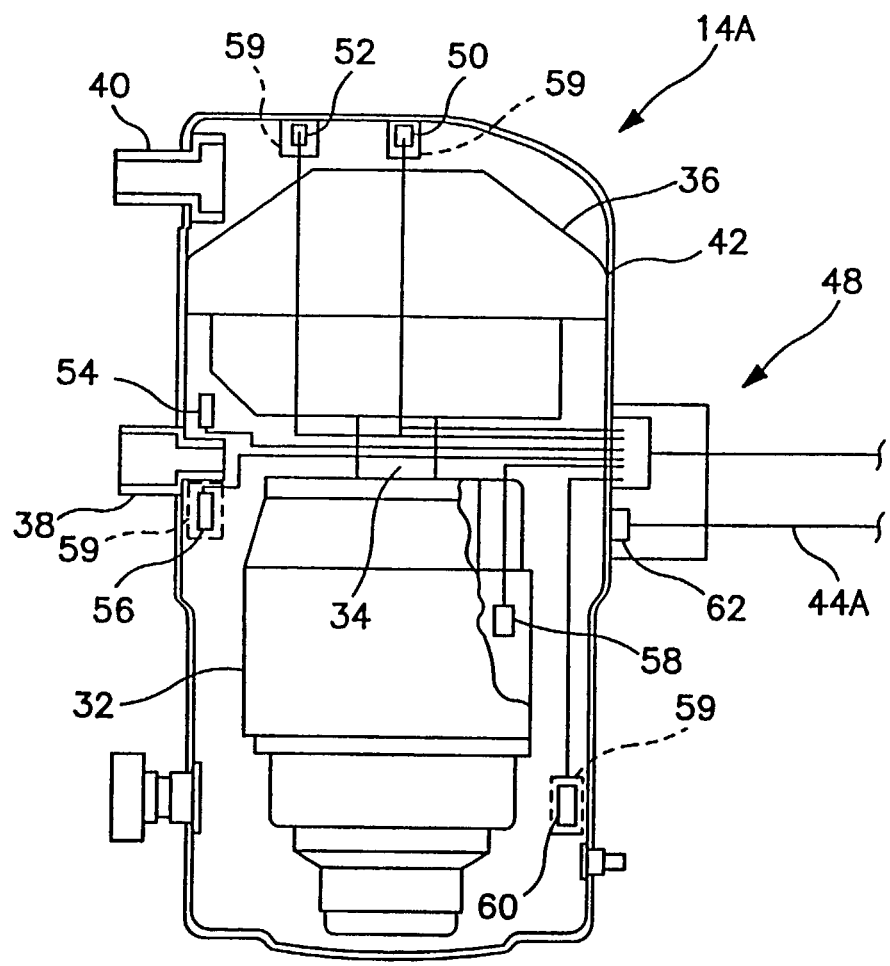
FIG. 3 is a schematic representation of a compressor of the present invention.

As shown in FIG. 3, each compressor 14A, 14B, 14C comprises an electric motor 32 driving a shaft 34 connected to a pressurizing unit 36. For purposes of the description herein, compressor 14A will be referred to, the other compressors 14B, 14C preferably having the same construction. The pressurizing unit may take on any suitable form. Typically, reciprocating pistons driven by a motor constitute the pressurizing device, but more and more, the quieter rotary devices found in scroll compressors and screw compressors are being employed to compress the vaporous refrigerant. A scroll compressor is illustrated in FIG. 3. The compressor 14A has a low side suction inlet 38 which receives the vaporous refrigerant from the evaporators 12A, 12B and a high side discharge outlet 40 through which hot, pressurized refrigerant is discharged from the compressor. The motor 32 and pressurizing unit 36 are preferably semi-hermetically or hermetically sealed within an outer casing or shell 42. The motors 32 of the compressors (FIG. 1) are each connected to a respective high voltage (e.g., three phase 480V AC or 208V AC) power line 44A, 44B, 44C extending from a power distribution center 46 within the food store. These lines are shielded, such as by placement within a conduit, as is required by electrical codes.

The compressors 14A, 14B, 14C each have a bus compatible compressor safety and control module 48 (broadly, "compressor operating unit") for monitoring at least one, but preferably several operating conditions or parameters of the compressor. The "operating parameters" in the preferred embodiment include (1) control parameters providing information used for controlling activation of the compressor 14, and (2) safety parameters providing information about whether the compressor is operating within its designed operational envelope or in a manner which could damage the compressor. It is envisioned that any number of parameters could be monitored, including only safety parameters or, less likely, only control parameters. Control parameters may include suction temperature, suction pressure and discharge pressure. Safety parameters usually include at least discharge pressure, oil level (or pressure), phase loss/reversal and motor winding temperature. However, the safety parameters preferably also include discharge temperature. As is apparent, some of the control parameters are also classified as safety parameters.

The bus compatible compressor safety and control module 48 (hereinafter, "BCCSCM") is constructed and arranged to detect the various operating parameters and control operation of the compressor. In the preferred embodiment, the BCCSCM comprises a processor 49 and multiple sensors in electronic communication with the processor. In the illustrated embodiment (FIG. 3), the compressor 14A is built with individual continuous reading analog sensors including a discharge pressure sensor 50, a discharge temperature sensor 52, a suction pressure sensor 54, a suction temperature sensor 56 and a motor winding temperature sensor 58 (FIG. 3). The temperature sensors 52, 56, 58 are variable resistance, RTD-type sensors. An oil level sensor 60 is of the type which changes the state of a circuit when the oil level falls below a predetermined minimum, and does not provide a continuous reading of the oil level. A power phase monitoring device 62 incorporated into the BCCSCM is capable of detecting both phase loss and phase reversal on the three phase power line 44A coming into the compressor 14A. It is to be understood that other sensors may be used without departing from the scope of the present invention.

An important feature of this invention is that the sensors 50-62 are preferably installed at the compressor assembly site and disposed within the hermetically (or semi-hermetically) sealed shell 42 of the compressor (FIG. 3). This construction is preferred because the sensors are protected in the shell and, particularly in the case of the suction pressure sensor 54, are located close to the pressurizing unit 36 for more accurate readings of compressor function. However, it is to be understood that the sensors 50-62 could be located other than in the shell 42 without departing from the scope of the present invention. For instance, it is envisioned that sensors could be replaceably received in openings in the shell 59 (schematically illustrated in phantom in FIG. 3) accessible from the exterior, or external to the compressor shell as in the case of a reciprocating semi-hermetic compressor, or any other motor driven compression device.

Figure 2:
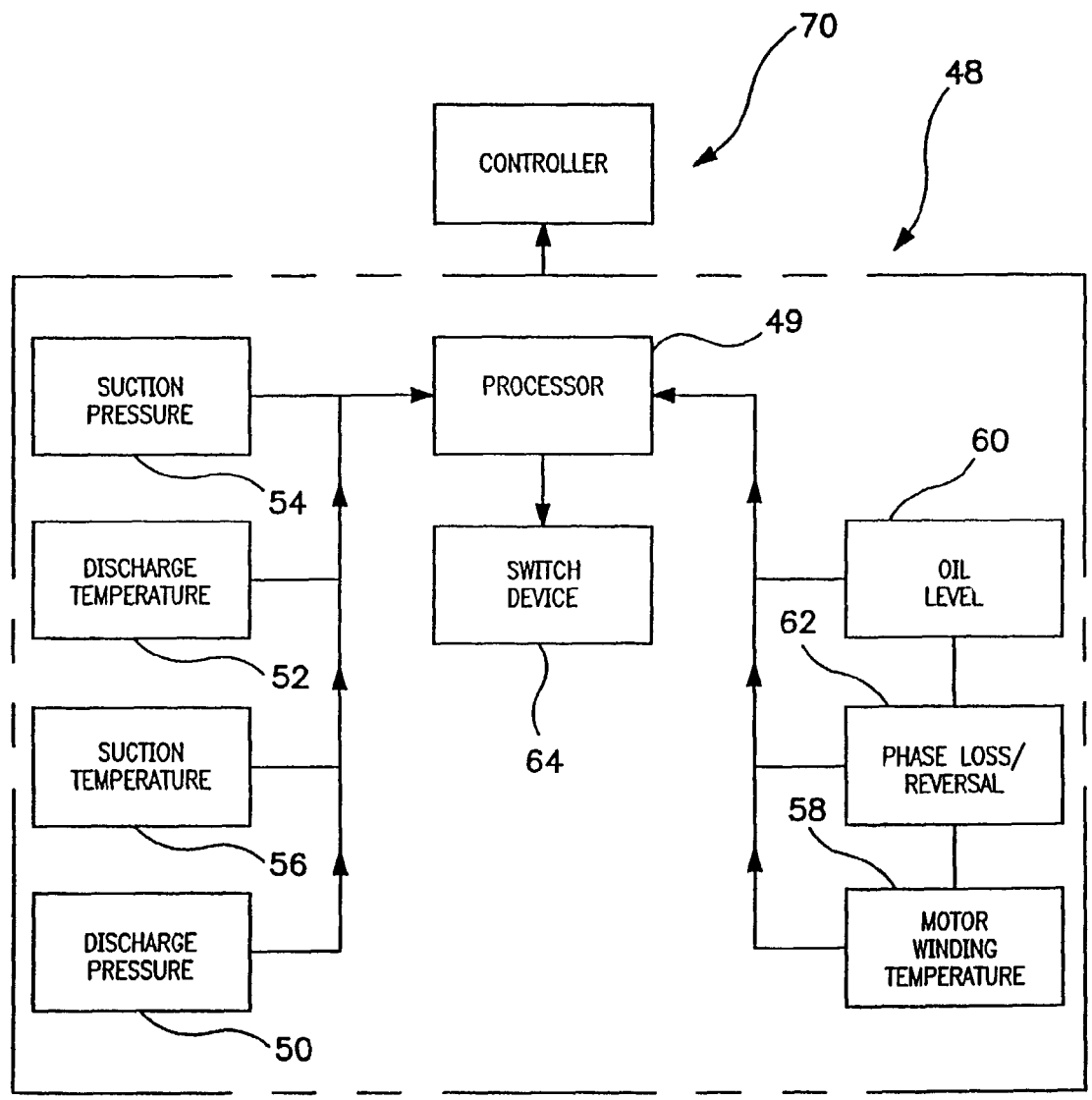
FIG. 2 is a schematic representation of a bus compatible compressor safety and control module of the present invention.

The processor 49 of the BCCSCM 48 in the preferred embodiment is a dual processor system, including a host microcontroller and a communication slave processor. The microcontroller and communications slave are not separately represented in FIG. 2, but are collectively represented as the processor 49. The host microcontroller preferably has a 256 byte internal RAM, 8 kilobytes of flash program memory, and 16 input/output pins for control interface. The communication slave, preferably, is an application specific integrated circuit (ASIC) for the field bus network described below (AS-Interface®). The communication slave translates the protocol of the field network into a signal understood by the host microcontroller, and vice versa. For example, if the field bus network provides four data bits per message, the communication slave may be configured to extend the data capabilities of the field bus network by interfacing with an intermediate memory device between the communication slave and the host microcontroller. Preferably, this intermediate device comprises an additional RAM. In such an embodiment, the communication slave and the host microcontroller interface with the RAM to extend the data capabilities of the field bus network by using sequential read or write cycles of the field bus network to build larger data sizes. In other words, rather than limiting the data sizes to four bits, larger data sizes are constructed by grouping multiple four-bit data transmissions. The communication slave sequentially writes the data into (or reads the data from) the additional RAM. The host microcontroller reads the data from or writes the data to the additional RAM. Thus, for example, a sixteen bit data parameter may be constructed over the course four successive data cycles.

Alternative structures can also be employed in this regard. For example, separate microprocessor, RAM, and program memory devices could replace the microcontroller, and the additional RAM device could be eliminated. Similarly, a field bus protocol having larger inherent data sizes could be accommodated without departing from the scope of the present invention, thereby potentially eliminating the need for a communication slave to translate the protocol.

The microcontroller is adapted to receive a signal from the sensor indicative of the value of the measured operating parameter at the time a reading is taken. The microcontroller also stores safety limit values for the measured safety parameters. The microcontroller is capable of generating a digital status information signal indicative of the values of the operating parameters. When a safety limit is traversed, the microcontroller is capable of generating a digital status information signal including specific information as to which safety parameter is out of specification. These signals are translated by the communication slave for sending over the field bus network.

The BCCSCM 48 for each compressor further includes a switch device 64, which is preferably a two pole solid state relay such as SSRD Series panel mount heavy duty solid state AC relay. The SSRD Series is made by Teledyne, Inc. of Los Angeles, Calif. and available from Allied Electronics of O'Fallon, Mo. The relay operates, upon receiving a command from the processor 49, to block two of the three phases of the electrical power to the compressor motor 32, thereby turning the motor off. It is to be understood that other switch devices may be used without departing from the scope of the present invention. The processor 49 is programmed to cause the relays to turn off the compressor (14A) when a safety limit value of one of the safety parameters is traversed.

In another embodiment, the SSRD is constructed to include an overcurrent protection capability. A current sensor (not shown) associated with the switch device 64 monitors the current through the SSRD. If the sensed current exceeds a threshold (e.g., 350A for 1.5 line cycles), the SSRD is shut off (rendered non-conducting) to protect the compressor motor 32. Such an overcurrent condition can occur, for example, if the rotor of the compressor motor 32 locks. Thus, a current sensor associated with the SSRD serves as a locked rotor detector. The sensed current information may also be used to detect other compressor abnormalities. Moreover, a current sensor that is a self-contained part of the compressor controlling device provides additional advantages. For example, current information is available on the system control bus via the BCCSCM 48 for use in safety and control applications, and the value of current information is not limited to energy management/monitoring functions.

The current sensor may be constructed internal to the SSRD, or it may be a sensor external to the SSRD. For example, a current sensing toroid could be used external to the SSRD to sense current. Alternatively, a high power, current sensing resistor may be included within the SSRD to sense current.

Figure 6:
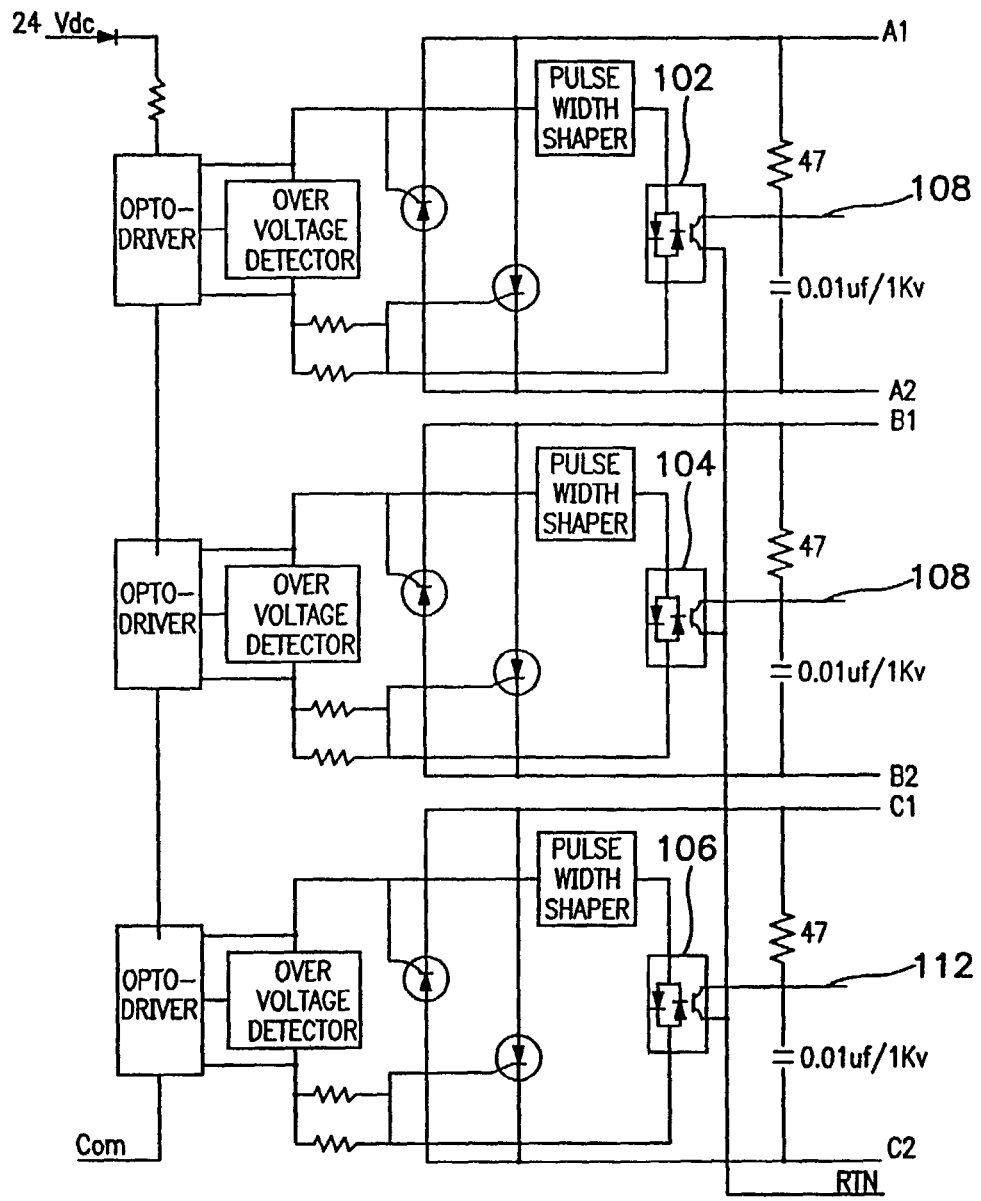
FIG. 6 is a schematic representation of aspects of a solid state relay device for use in connection with the present invention.

FIG. 6 is a schematic representation of another aspect of a preferred SSRD. A typical commercial refrigeration compressor system uses three-phase electrical power. Thus, by controlling the SSRD, the application of phases A, B, and C of such a three-phase power system is also controlled.

As illustrated in FIG. 6, the SSRD preferably includes three opto-isolators 102, 104, 106 that are constructed as an integral component of the overall SSRD assembly. Opto-isolator 102 is associated with phase A. Opto-isolator 104 is associated with phase B. Opto-isolator 106 is associated with phase C. The opto-isolators detect the zero-crossing of the respective phases with which they are associated. Thus, when phase A crosses zero, opto-isolator 102 produces an output, via its collector, on line 108. Likewise, when phase B crosses zero, opto-isolator 104 produces an output on line 110. Similarly, when phase C crosses zero, opto-isolator 106 produces an output on line 112. As one skilled in the art can now appreciate from the foregoing, such zero-crossing information amounts to phase reference information, which may be compared to determine the relationship between the power phases.

As those skilled in the art will also appreciate, if power is applied to the compressor motor 32 when an improper phase relationship exists, the compressor motor may be damaged or destroyed. For example, if a scroll compressor (not shown) is run backwards, for even an instant, because of an improper phase relationship, the compressor may be seriously damaged or ruined. Advantageously, the zero-crossing detection capability of the present invention is integral to the SSRD and available when the SSRD is open-circuited—when it is non-conducting and no power is applied to the compressor motor 32. Hence, the BCCSCM 48 can monitor the phases for a proper polarity relationship before applying power to the compressor motor 32. Stated differently, the BCCSCM 48 can determine the presence of an improper phase relationship by comparing the phase information to an acceptability standard and prevent potential damage to the compressor motor 32 that would otherwise occur if power were applied to the motor. In contrast, prior art phase polarity detection schemes rely on devices external to the SSRD. More importantly, such prior art schemes do not detect an improper phase relationship before applying power. Rather, such systems check the phase relationship only after power application. In such systems, if an improper phase relationship is detected, power is removed. As those skilled in the art can appreciate, the compressor motor 32 may be damaged or destroyed before power is removed, even if it is removed relatively rapidly. Thus, the SSRD, as shown in FIG. 6 provides an important improvement over the prior art because it provides for phase detection prior to the application of power.

A master controller 70 for controlling all of the compressors 14A, 14B, 14C of the refrigeration system is in electronic communication with all of the BCCSCM's 48 of the refrigeration system via line 80. The controller includes a CPU 72 which coordinates data transfer among the components of the system. The CPU 72 also processes data acquired from the BCCSCM's 48 and determines control commands to be sent to the BCCSCM's. In the preferred embodiment, the CPU 72 includes a 16 bit RISC processor, has 64 kilobytes of read only memory (ROM) and 16 kilobytes of random access memory (RAM). A real time clock is needed for the CPU 72 to perform time-based control functions. Moreover, the CPU 72 preferably has at least two serial interfaces to permit connection to a local human-machine interface (hereinafter, "HMI"), as well as a remote interface. The CPU 72 has both digital and analog inputs and outputs, and is powered by a 24V DC power supply 74 transformed and rectified from a 120V AC feed line 69.

The controller 70 further includes a communications module 76 (COM. MODULE) to permit the CPU 72 to work with a field bus networking system. The field bus networking system is designed to connect sensors, actuators and other control equipment at the field level. An example of a suitable field bus networking system is the AS-Interface® (or AS-i) networking system. Components for the AS-i network are sold commercially by Siemens Aktiengesellschaft of Germany, and available in the United States from Siemens Energy Automation and Control, Inc. of Batavia, Ill. The communications module 76 is powered by the same 24V power supply 74 used by the CPU 72. However, the field bus network operates on a separate 24V-30V DC power supply 78 (NETWORK POWER SUPPLY) connected to a 120V AC feed line 69. The field bus network further includes an unshielded two wire bus 80 connecting the communications module 76 (and hence the CPU 72) to all of the BCCSCM's. One wire is a ground wire and the other is a communication and power line which carries all communication and power for the BCCSCM's 48. Power for the BCCSCM's is supplied from the network power supply 78 through line 79, which has a communications decoupling feature allowing communications and power to be supplied over the same line. The BCCSCM's 48 are each connected to the bus 80 at nodes 82 by a respective coupling (not shown) which penetrates insulation of the bus cable and makes contact with the wires. Each BCCSCM 48 is plugged into the coupling to connect the control and safety module to the network.

The master controller 70 also controls cycling of the condenser fans 22. For example, the master controller 70 may monitor discharge pressure and liquid refrigerant temperature to determine when to cycle the condenser fans 22. Similarly, the master controller 70 may monitor discharge pressure and outdoor ambient temperature to determine whether to split the condenser. In the illustrated embodiment, the master controller 70 transmits these cycling commands from the CPU 72 to a separate condenser controller 84 located close to the fans 22. The condenser controller 84 executes the commands for shutting down or energizing the condenser fans 22. Because the condenser is typically located remotely from the compressor rack, in many configurations it will be undesirable or impractical to locate the condenser controller 84 on the same field network bus (e.g., AS-i bus) as the CPU 72. FIG. 1 illustrates such a situation, in which the condenser controller preferably has its own field bus network (e.g., another AS-i bus) for controlling a Bus Compatible Fan Control Module (BCFCM) (not shown) that controls the condenser fans 22. In other words, the condenser controller 84 can have its own field bus network for controlling the condenser fans, just like the network of the compressors 14A, 14B, 14C with the master controller 70.

For example, the CPU 72 may communicate with the condenser controller 84 over a relatively longer distance network (e.g., the Multipoint Interface or "MPI" available from Siemens). In this way, the condenser controller 84 acts as a gateway to extend the range of the master controller 70 in a situation in which the primary field bus network associated with the compressor rack (e.g., AS-i bus) could not practically be used. Thus, the master controller 70 provides operating and control functions to the condenser controller 84. The condenser controller 84, via its own field bus network, supplies the control information to the BCFCM which drives the fans 22. Likewise, data available at the condenser (e.g., an ambient air temperature associated with the condenser and information regarding which fan(s) is/are on) may be transmitted to the master controller 70. In a preferred embodiment, an air temperature sensor (not shown) provides ambient air temperature data directly to the condenser controller 84 (i.e., independently of any field bus network), which transmits such data to the master controller 70.

Advantageously, if the master controller 70 ceases communications with the condenser controller 84, the condenser controller is preferably programmed to independently determine and provide at least some of the control information required to drive the fans 22 via the BCFCM.

Other condenser control arrangements may be used without departing from the scope of the present invention. For instance, the condenser controller 84 could be eliminated and its functions programmed into the master controller.

Figure 4:
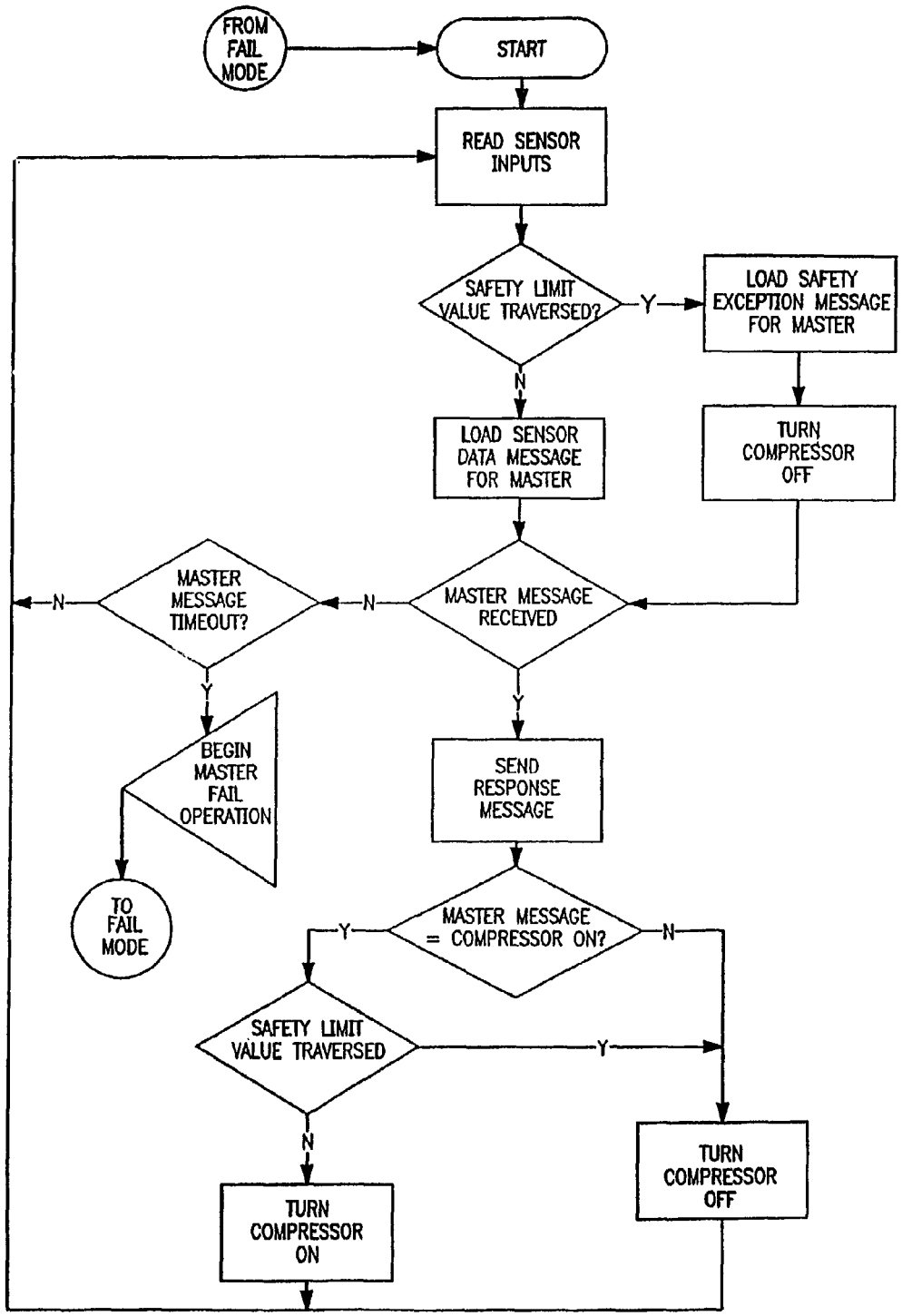
FIG. 4 is a flow diagram illustrating operation of the control and safety module in a standard operating mode.

Referring now to FIG. 4, in standard operation, the sensors 50-62 of each BCCSCM 48 (e.g., the BCCSCM associated with compressor 14A) provide information regarding the operating parameters monitored by the sensors and these are read in a first operation of the BCCSCM processor 49. The information provided by the sensors 50-62 could be limited to whether or not a pre-set safety limit value has been traversed. However, preferably at least some of the sensors would provide signals to the processor 49 of each BCCSCM 48 indicative of the actual value of the operating parameter at the time sampled. In a preferred embodiment, the sensors for discharge pressure (50) and temperature (52), suction pressure (54) and temperature (56) provide a digital signal to the processor 49 indicative of the actual value of the parameter measured. Thus, the sensor/transducer converts the analog data to a digital format before providing the information to the processor 49. In a preferred embodiment, at least the sensors 50-56 are dual function pressure/temperature sensors having an addressable, 14 bit analog to digital converter. The convertor is located within the sensor housing and converts the analog signal from the detecting device (e.g., strain gauge or thermistor) to a digital representative of the measured parameter. The motor winding temperature sensor (58) provides an analog signal to the processor 49 indicative of the actual value of the parameter measured.

The oil level sensor 60 provides a circuit open or circuit closed signal to the microcontroller indicative only of whether the oil level safety limit value has been traversed. As explained with respect to FIG. 6, phase loss or phase reversal is preferably monitored/detected by monitoring the zero crossings of each phase with a plurality of opto-isolator devices. An alternative, separate power phase monitoring device 62 may also be used. Such a separate power phase monitoring device 62 would, for example, provide a circuit open or a circuit closed signal to the microcontroller to indicate whether a phase loss or phase reversal has occurred.

The processor 49 of each BCCSCM 48 checks the inputs from each sensor to determine whether a safety limit value for any of the measured compressor characteristics has been exceeded. If no safety limit values are exceeded, the processor 49 loads the sensor data for transmission to the master controller 70 when the processor is queried. The master controller 70 is the master network controller in standard operation of the system. In the illustrated embodiment, the microcontroller of the processor 49 stacks the information in its communication slave to await transmission to the master controller 70. The processor 49 then waits for a message from the master 70 containing commands and a query for the sensor data. As soon as the message is received, the processor 49 responds over the communication and power line of the two wire bus 80 to the controller 70 with the information data stored from the sensors 50-62.

Data from all of the processors 49 flows in a stream over the communication and power line of the bus 80 to the communication module 76 and thence to the CPU 72 of the rack master controller 70. The communication protocol allows the CPU 72 to associate the operating parameter information received with particular compressors, and to discriminate between different operating parameters for each compressor. More specifically, each BCCSCM 48 is assigned a particular address, which allows the controller 70 to communicate individually with each of the BCCSCM's over the same line, and also allows the BCCSCM processors 49 to identify themselves to the master controller.

The data is now available through interfacing with the rack master controller 70, either remotely or by a local human machine interface, to view individual compressor data. The processor 49 also looks for the command portion of the master controller message for a command to turn the compressor (14A, 14B or 14C) on or off. If such a command is present, the processor 49 executes it by operating the solid state relay (switch device 64) to turn the compressor on or off. However, if the command is to turn the compressor on, the processor 49 will not execute it if the processor has previously determined that a safety limit value of one of the safety parameters has been traversed. It is envisioned that other capacity control commands could be received and executed by the processor such as when the compressor was of a variable capacity type. The software of the processor 49 then returns to the initial step of reading the sensor inputs.

However, when one or more of the inputs from the sensors 50-62 to the processor 49 traverses a safety limit value, the processor loads a safety exception message for the rack master controller 70 and immediately shuts down the compressor (e.g., compressor 14B). The safety exception message is loaded into the communication slave of the processor 49 at the top of the stack of information to be sent to the master controller. When the processor 49 receives a message from the master controller 70, it responds by including the safety exception message for the controller. The controller 70 will know not only that one of the safety limit values for a particular compressor was traversed, but which safety parameter or parameters were traversed and in most instances the actual values of those parameters. An alarm can be activated by the controller to alert the appropriate persons that a problem exists. The information can be accessed by a technician via a suitable HMI in the system (located, for example, at the controller 70), or remotely such as through an Internet connection. Thus, the technician is able to know immediately the nature of the problem for more efficient troubleshooting. The information regarding the operating parameters of the properly functioning compressors (e.g., 14A, 14C) can also be accessed in this manner.

The master controller 70 will also receive information concerning control parameters of the compressors 14A, 14B, 14C. A primary control parameter is suction pressure. The controller 70 is programmed so that it manipulates (e.g., such as by averaging) the suction pressure readings from the BCCSCM's 48 to determine the refrigeration level produced by the multiplexed compressors 14A, 14B, 14C. The controller 70 uses this information to strategize cycling compressors in the system to achieve the desired refrigeration capacity level. Other control parameters such as suction temperature, discharge temperature and discharge pressure are also used by the controller to control the system. For instance, the suction temperature readings may be used to adjust electronic expansion valves (not shown). The controller is configured to ignore in its calculations of collective suction pressure any compressor which is turned off or which has an anomalous suction pressure reading.

Figure 5:
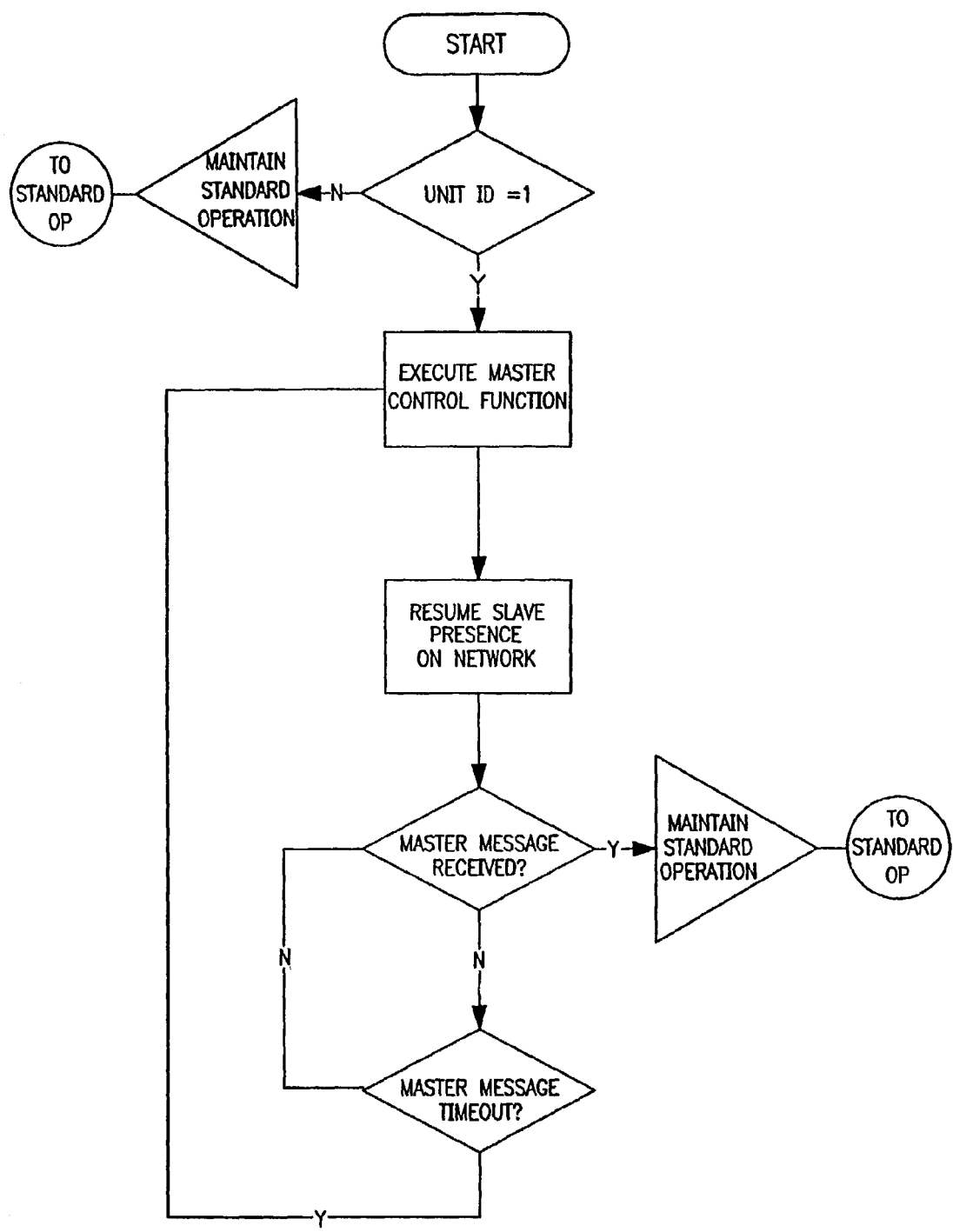
FIG. 5 is a flow diagram illustrating operation of the control and safety module in a master controller failure mode.

An important feature of the invention is that should the master controller 70 (and in particular the CPU 72) fail, the BCCSCM's 48 are capable of performing the controller functions for the compressors 14A, 14B, 14C. A flow chart of the operation of the processors 49 in the master fail mode is shown in FIG. 5. As stated above with reference to FIG. 4, the processor 49 of each BCCSCM 48 waits a predetermined time period for a message from the master controller 70. If the period times out with no message, the processor 49 defaults to a master fail operation mode. The processors of the other compressors will opt to this mode as well. The BCCSCM's 48 communicate with each other over the communication and power line of the bus 80, in addition to communicating with the controller 70. In the failure mode, each processor 49 determines whether it is to have primary control. One BCCSCM's processor 49 will have previously been programmed with a certain identification or address, e.g., ID=1. Typically, this would be the BCCSCM 48 of the first compressor 14A in the system. Any BCCSCM not having this identification will continue to operate only responsively to commands received over the field bus network (i.e., it resumes standard operation as a slave). It is also envisioned that the slave processors 49 (i.e., processors associated with compressors 14B, 14C) would start a second timer once entering the failure mode to look for a message from the processor of the BCCSCM 48 designated for primary system control in the failure mode (i.e., the processor associated with compressor 14A). If the other processors do not receive such a message, a second BCCSCM 48 would be preselected (e.g., the BCCSCM having ID=2 associated with compressor 14B) to control the operation of the system in the failure mode. Thus, the system is highly granular, allowing for multiple failure while maintaining operation.

For disclosure purposes, the processor 49 of the BCCSCM 48 of compressor 14A is identified as the primary control or master, in case of failure of the master controller 70, and will execute a master control function involving at least basic compressor cycling. In that regard, the primary control processor 49 is capable of determining the collective suction pressure of the operating compressors 14A, 14B, 14C and providing control commands for itself and the other slave processors to turn compressors on and off to maintain the refrigeration capacity requirements of the system. After performing this function, the "primary" processor 49 resumes a slave presence on the network which allows it to again look for a message from the master controller 70 for a period of time before returning again to perform a system control function. Once the master controller 70 is detected, the primary control processor 49 returns to its standard (slave) mode of operation.

The distributed intelligence control for commercial refrigeration achieves objects of ease of assembly and installation, and enhanced control. The compressors 14A, 14B, 14C of the present invention are configured with one or more sensors (50-62) to optimize uniformity of measurement of operation parameters and to minimize installation variances as well as provide protection of such sensor devices. The modularity of the BCCSCM of each compressor and its intelligence interface with the master controller 70 to assure optimum compressor performance, as well as granularity of the system.

Assembly of a refrigeration system is made easier by simplification of the wiring which must be done upon installation. The high voltage lines 44A, 44B, 44C must still be run to the compressors 14A, 14B, 14C for primary operation, according to electrical codes, it will be necessary to shield these lines such as by placing them in conduit. However, no separate power lines other than three phase high voltage lines (44) must be run to the compressor motors 32, and it is unnecessary to run additional high voltage lines to the BCCSCM's. Instead, a single high voltage feed line 69 supplies the power supply 74 for the CPU 72 and communication module 76 and also the network power supply 78.

Power for all of the BCCSCM's 48 is supplied through the same two wire bus 80 extending from the communications module 76 to the control and safety modules 48. The bus 80 does not need to be shielded because it carries only 30VDC power. Preferably, the wiring of the BCCSCM's 48 to the master controller 70 is done at the factory where the compressors 14A, 14B, 14C are mounted together with the controller on a compressor rack (not shown) so that no power wiring of any kind for the BCCSCM's is required at the building site. The number of BCCSCM's 48 attached to the bus 80 up to some upper limit of the controller 70 (e.g., 31) is immaterial and requires no special re-configuration of the controller.

As stated above, the connection of the BCCSCM's 48 to the communication bus 80 achieves not only power, but communications for the control and safety modules. No separate feedback wiring from the individual sensors is necessary. The BCCSCM processor 49 executes commands from the master controller 70 and is capable of reporting back to the controller that the command has been executed. The processor 49 reports the readings from all of the sensors 50-58, and not only whether a safety limit value has been exceeded, but exactly which one it is. This enables the master controller 70 to provide specific information to a repair technician without any additional wiring between the controller and the BCCSCM 48. In addition to permitting refrigeration level control by the controller 70, this allows the controller to make other adjustments in the system and to monitor trends for use in failure prediction.

The processors 49 of the BCCSCM's 48 also preferably have the embedded intelligence to operate the refrigeration system in case the master controller 70 fails. In that regard, the BCCSCM's 48 are capable of communicating with each other as well as the master controller 70 over the two wire bus 80. In case of failure of the master controller, one of the BCCSCM's 48 will take over as master or "primary" and can perform at least the function of averaging the measured suction pressure readings from the operating compressors to determine refrigeration level and determine how to cycle the compressors to maintain a predetermined capacity.

It is to be understood that the foregoing description and accompanying drawing have been given only by way of illustration and example, and that changes and modifications in the present disclosure, which will be readily apparent to all skilled in the art, are contemplated as within the scope of the present invention, which is limited only by the scope of the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A system comprising:
   a first compressor;
   first and second sensors coupled to the first compressor, the first and second sensors adapted to sense first and second operating parameters, respectively, of the first compressor;
   a first compressor safety and control module coupled to the first and second sensors, the first compressor safety and control module being configured to receive first and second signals from the first and second sensors, respectively, the first and second signals being indicative of the first and second operating parameters, respectively, and determine a status of the first compressor based at least in part on the first and second operating parameters;
   a second compressor;
   third and fourth sensors coupled to the second compressor, the third and fourth sensors adapted to sense third and fourth operating parameters, respectively, of the second compressor;
   a second compressor safety and control module coupled to the third and fourth sensors, the second compressor control module being configured to receive third and fourth signals from the third and fourth sensors, respectively, the third and fourth signals being indicative of the third and fourth operating parameters, respectively, and determine a status of the second compressor based at least in part on the third and fourth operating parameters;
   a bus coupled to the first and second compressor safety and control modules;
   a rack controller coupled to the bus, the rack controller including an interface and being configured to receive fifth and sixth signals from the first and second compressor safety and control modules, respectively, the fifth and sixth signals being indicative of the status of the first and second compressors, respectively, and communicate a seventh signal via the interface;
   wherein the first compressor safety and control module includes a first microcontroller and a first communications processor, the first microcontroller receives the first and second signals and determines the status of the first compressor, and the first communications processor creates the fifth signal having a protocol;
   wherein the second compressor safety and control module includes a second microcontroller and a second communications processor, the second microcontroller receives the third and fourth signals and determines the status of the second compressor, and the second communications processor creates the sixth signal having the protocol;
   wherein the bus supports a network utilizing the protocol; and
   wherein the rack controller includes a third communications processor and a processing unit, the communications processor receives the fifth and sixth signals and translates the protocol of the fifth and sixth signals, and the processing unit processes the status of the first and second compressors.

2. A system as set forth in claim 1 wherein the first operating parameter is a control parameter.

3. A system as set forth in claim 1 wherein the first operating parameter is a safety parameter.

4. A system as set forth in claim 1 wherein the sensors are selected from the group consisting of a discharge pressure sensor, a discharge temperature sensor, a suction pressure sensor, a suction temperature sensor, a motor winding temperatures sensor, an oil level sensor, and a power phase monitoring device.

5. A system as set forth in claim 1 wherein the first compressor has a hermetically sealed shell and at least one of the first and second sensors is disposed within the hermetically sealed shell of the first compressor, and
   wherein the second compressor has a hermetically sealed shell and at least one of the third and fourth sensors is disposed within the hermetically sealed shell of the second compressor.

6. A system as set forth in claim 1 wherein the processing unit determines control commands for the first and second compressors, and
   wherein the control commands are communicated to the first and second safety and control modules via the bus.

7. A system as set forth in claim 1 wherein the interface is a serial interface.

8. A system as set forth in claim 1 and further comprising a human-machine interface (HMI) coupled to the rack controller via the interface.

9. A system as set forth in claim 8 wherein the HMI is a local interface.

10. A system as set forth in claim 8 wherein the HMI is directly coupled to the interface.

11. A system as set forth in claim 8 wherein the HMI is a remote interface.

12. A system as set forth in claim 8 wherein the HMI is coupled to the interface via the Internet.

13. A system as set forth in claim 1 wherein the system further comprises a power supply coupled to the bus, and wherein the bus is configured to provide power to the first and second compressor safety and control modules via the bus.

14. A system as set forth in claim 13 wherein the rack controller includes the power supply.

15. A system as set forth in claim 13 wherein the bus is a two-wire bus adapted to carry the signals and the power.

16. A system as set forth in claim 15 wherein a first wire of the bus is grounded and a second wire of the bus carries the fifth and sixth signals and the power.

17. A system as set forth in claim 1 and further comprising a condenser having a condenser fan and wherein the rack controller controls the condenser fan.

18. A system as set forth in claim 17 wherein the system further comprises a condenser controller in communication with the rack controller, and
   wherein the rack controller controls the condenser fan via the condenser controller.

19. A system comprising:
   a plurality of compressors, each compressor including
      a plurality of sensors, each sensor adapted to sense an operating parameter of the compressor and to produce a signal indicative of the operating parameter;
      a processor coupled to the plurality of sensors, the processor being configured to receive the signals indicative of the operating parameters and generate a signal indicative of the status of the compressor, the signal indicative of the status of the compressor being based at least in part on the signals indicative of the operating parameters;

a bus coupled to the processors; and a controller coupled to the bus, the controller being configured to receive the signals indicative of the status of the compressors and including an interface adapted to communicate with a second network.

20. A system as set forth in claim 19 wherein the operating parameters are selected from the group consisting of a control parameter and a safety parameter.

21. A system as set forth in claim 19 wherein the sensors are selected from the group consisting of a discharge pressure sensor, a discharge temperature sensor, a suction pressure sensor, a suction temperature sensor, a motor winding temperatures sensor, an oil level sensor, and a power phase monitoring device.

22. A system as set forth in claim 19 wherein at least one of the compressors includes a hermetically sealed shell and wherein at least one of the sensors of at least one of the compressors including a hermetically sealed shell is disposed within the hermetically sealed shell.

23. A system as set forth in claim 19 wherein each processor includes a microcontroller and a communications processor, the microcontroller receives the signals indicative of the operating parameters of the respective compressor and is configured to determine the status of the respective compressor, and the communications processor creates the signal indicative of the status of the respective compressor.

24. A system as set forth in claim 19 wherein the signals indicative of the status of the compressors have a protocol, and wherein the bus supports a network utilizing the protocol.

25. A system as set forth in claim 24 wherein the controller is further configured to translate the protocol of the signals indicative of the status of the compressors and process the status of the compressors.

26. A system as set forth in claim 25 wherein the controller is adapted to communicate with a human-machine interface (HMI) coupled to the controller via a second network and the interface, and wherein the communication between the controller and the HMI utilizes a second protocol.

27. A system as set forth in claim 26 wherein the second network is the Internet.

28. A system as set forth in claim 24 wherein the controller includes a communications module and a processing unit, the communications module receives the signals indicative of the status of the compressors and translates the protocol of the signals, and the processing unit processes the status of the compressors.

29. A system as set forth in claim 28 wherein the processing unit determines control commands for the compressors, and wherein the control commands are communicated to the processors via the bus.

30. A system as set forth in claim 12 wherein the interface is a serial interface.

31. A system as set forth in claim 12 and further comprising a human-machine interface (HMI) coupled to the controller via the second network.

32. A system as set forth in claim 31 wherein the HMI is coupled to the interface via the Internet.

33. A system as set forth in claim 12 further comprising a power supply coupled to the bus, and wherein the bus is configured to provide power to the processors via the bus.

34. A system as set forth in claim 33 wherein the controller includes the power supply.

35. A system as set forth in claim 33 wherein the bus is a two-wire bus adapted to carry the signals and the power.

36. A system as set forth in claim 33 wherein a first wire of the bus is grounded and a second wire of the bus carries the signals indicative of the status of the compressors and the power.

37. A system as set forth in claim 12 and further comprising a condenser having a condenser fan and wherein the controller controls the condenser fan.

38. A system as set forth in claim 37 and further comprising a condenser controller in communication with the controller, and wherein the controller controls the condenser fan via the condenser controller.

39. A system comprising:

a compressor;

a sensor adapted to sense an operating parameter of the compressor and to produce a signal indicative of the operating parameter;

a safety and control module in communication with the sensor, the module being configured to receive the signal indicative of the operating parameter and to generate a signal indicative of the status of the compressor;

a field network; and a controller in communication with the safety and control module via the field network, the controller being configured to receive the signal indicative of the status of the compressor and including an interface adapted to communicate with a machine via a second network.

40. A system as set forth in claim 39 wherein the safety and control module is further configured to control the operation of the compressor based at least in part on the signal indicative of the operating parameter.

41. A system as set forth in claim 39 wherein the operating parameters are selected from the group consisting of a control parameter and a safety parameter.

42. A system as set forth in claim 39 wherein the sensor is selected from the group consisting of a discharge pressure sensor, a discharge temperature sensor, a suction pressure sensor, a suction temperature sensor, a motor winding temperatures sensor, an oil level sensor, and a power phase monitoring device.

43. A system as set forth in claim 39 wherein the compressor includes a hermetically sealed shell and wherein the sensor is disposed within the hermetically sealed shell.

44. A system as set forth in claim 39 wherein the safety and control module includes a microcontroller and a communications processor, the microcontroller receives the signal indicative of the operating parameter and is configured to determine the status of the compressor based at least in part on the operating parameter, and the communications processor creates the signal indicative of the status of the compressor.

45. A system as set forth in claim 39 wherein the signal indicative of the status of the compressors has a protocol, and wherein the field network supports the protocol.

46. A system as set forth in claim 45 wherein the controller is further configured to translate the protocol of the signals indicative of the status of the compressors and process the status of the compressors.

47. A system as set forth in claim 45 wherein the communication between the controller and the machine utilizes a second protocol.

48. A system as set forth in claim 47 wherein the second network is the Internet.

49. A system as set forth in claim 39 wherein the controller includes a communications processor and a processing unit, the communications processor receives the signal indicative of the status of the compressor and translates the protocol of the signal, and the processing unit processes the status of the compressor.

50. A system as set forth in claim 49 wherein the processing unit determines a control command for the compressor, and wherein the control command is communicated to the safety and control module via the field network.

51. A system as set forth in claim 39 wherein the interface is a serial interface.

52. A system as set forth in claim 39 and further comprising a bus adapted to support the field network.

53. A system as set forth in claim 52 wherein the system further comprises a power supply coupled to the bus, and wherein the bus is configured to provide power to the safety and control module via the bus.

54. A system as set forth in claim 53 wherein the controller includes the power supply.

55. A system as set forth in claim 53 wherein the bus is a two-wire bus adapted to support the field network and the power.

56. A system as set forth in claim 55 wherein a first wire of the bus is grounded and a second wire of the bus carries the signals indicative of the status of the compressors and the power.

57. A system as set forth in claim 39 wherein the system further comprises a condenser having a condenser fan, and wherein the controller controls the condenser fan.

58. A system as set forth in claim 57 and further comprising a condenser controller in communication with the controller, and wherein the controller controls the condenser fan via the condenser controller.

59. A system as set forth in claim 58 wherein the system further comprises a second field network, and wherein the controller and the condenser controller communicate via the second field network.

60. A system comprising:
a compressor;
a compressor operating unit configured to monitor operation of the compressor with at least one sensor, the operating unit including a communications processor configured to create a first signal having a first protocol, the first signal being indicative of the operation of the compressor; and
an electronic device in communication with the compressor operating unit, the electronic device including a processing unit, a communications module, and an interface, the electronic device being configured to receive the first signal, translate the first signal, create a second signal having a second protocol, the second signal being indicative of the operation of the compressor, and communicate the second signal via the interface.

61. A system as set forth in claim 60 wherein the sensor is selected from the group consisting of a discharge pressure sensor, a discharge temperature sensor, a suction pressure sensor, a suction temperature sensor, a motor winding temperatures sensor, an oil level sensor, and a power phase monitoring device.

62. A system as set forth in claim 60 wherein the compressor includes a hermetically sealed shell and wherein the sensor is disposed within the hermetically sealed shell.

63. A system as set forth in claim 60 wherein the compressor operating unit is further configured to control the operation of the compressor based at least in part on the signal indicative of the operating parameter.

64. A system as set forth in claim 60 and further comprising a machine in communication with the electronic device via the interface.

65. A system as set forth in claim 64 wherein the communication between the compressor operating unit and the electronic device is via a first network and the communication between the device and the machine is via a second network.

66. A system as set forth in claim 65 wherein the second network is the Internet.

67. A system as set forth in claim 64 wherein the machine is a remote human-machine interface.

68. A system as set forth in claim 60 wherein the interface is a serial interface.

69. A system as set forth in claim 60 wherein the compressor operating unit further includes a microcontroller, the microcontroller being configured to receive a signal from the sensor and determine the operation of the compressor based at least in part on the signal from the sensor.

70. A system as set forth in claim 60 wherein the processing unit determines a control command for the compressor, and wherein the control command is communicated to the compressor operating unit by a third signal having the first protocol.

71. A system as set forth in claim 60 wherein the system further comprises a condenser having a condenser fan, and a condenser controller in communication with the electronic device.

72. A system as set forth in claim 60 and further comprising a low-voltage power and communication line extending between the compressor operating unit and the device.

73. A system as set forth in claim 72 wherein the low-voltage power and communication line supports a field network utilizing the first protocol.

74. A system as set forth in claim 72 wherein the system further comprises a power supply coupled to the low-voltage power and communication line, and wherein the power supply is configured to provide power to the safety and control module via the power and communication line.

75. A system as set forth in claim 74 wherein the controller includes the power supply.

76. A system as set forth in claim 60 wherein the electronic device is a rack controller.

77. A method of controlling a system having at least one compressor, a compressor operating unit including a processor and at least one sensor coupled to the compressor, and an electronic device in communication with the compressor operating unit, the method comprising:
sensing an operating parameter of the compressor with the sensor;
communicating the operating parameter to the compressor operating unit;
determining a status of the compressor, the determination being based at least in part on the operating parameter;
communicating the status of the compressor to the electronic device;
interfacing with the electronic device, the act of interfacing including communicating the status of the compressor;
wherein the act of communicating the status of the compressor includes the act of creating a first signal representing the status of the compressor, the first signal having a first protocol; and
wherein the act of interfacing with the electronic device includes the acts of translating the first signal and creating a second signal representing the status of the compressor, the second signal having a second protocol.

78. A method as set forth in claim 77 wherein the electronic device is a rack controller.

79. A method as set forth in claim 78 and further comprising communicating a command from the rack controller to the compressor operating unit.

80. A method as set forth in claim 79 wherein the act of communicating a command from the rack controller to the compressor operating unit includes utilizing the first protocol for communication between the rack controller and the compressor operating unit.

81. A method as set forth in claim 80 wherein the act of utilizing a protocol includes assigning an address to the compressor operating unit, and
wherein the act of communicating the status of the compressor further includes transmitting a signal from the compressor operating unit to the rack controller, the signal including the command and the address.

82. A method as set forth in claim 81 and further comprising, at the compressor operating unit, determining if the signal includes the assigned address and performing the command when the signal includes the assigned address.

83. A method as set forth in claim 77 wherein the act of communicating the operating parameters includes communicating a signal indicative of the operating parameters and reading a value of the signal.

84. A method as set forth in claim 77 wherein the act of determining the status of the compressor includes determining whether a safety limit is traversed by the sensed operating parameter.

85. A method as set forth in claim 77 wherein the act of communicating a status of the compressor includes communicating the operating parameter to the electronic device.

86. A method as set forth in claim 77 wherein the compressor operating unit includes a memory, and
wherein the act of communicating the status of the compressor includes stacking a value of the operating parameter in the memory, querying the processor for the value, and communicating the stacked value to the electronic device.

87. A method as set forth in claim 77 wherein the system includes a bus,
wherein the act of communicating the status of the compressor is communicated via the bus,
wherein the method further comprises powering the processor, and
wherein the power for powering the processor is provided via the bus.

88. A method as set forth in claim 77 wherein the act of utilizing a first protocol includes assigning an address to the compressor operating unit, and
wherein the act of communicating the status of the compressor further includes transmitting a signal from the compressor operating unit to the rack controller, the signal including the address.

89. A method as set forth in claim 77 wherein the act of interfacing is performed via the Internet.

90. A method as set forth in claim 77 wherein the interface is a serial interface.

91. A method as set forth in claim 77 wherein the system further includes a human machine interface (HMI) and the act of interfacing includes locally coupling the HMI with the interface.

92. A method as set forth in claim 77 wherein the system includes a human machine interface (HMI) and the act of interfacing includes remotely coupling the HMI with the interface.

93. A method as set forth in claim 92 wherein the act of remotely coupling the HMI with the interface is performed via the Internet.

94. A method as set forth in claim 77 wherein the system further comprises a condenser, and wherein the method further comprises
communicating a command to the condenser for controlling the condenser based on the status of the compressor.

\* \* \* \* \*